us011603421B2

United States Patent
Ju et al.

(10) Patent No.: US 11,603,421 B2
(45) Date of Patent: Mar. 14, 2023

(54) METHOD FOR PREPARING THERMOPLASTIC COPOLYMER, THERMOPLASTIC COPOLYMER PREPARED THEREFROM, AND THERMOPLASTIC RESIN COMPOSITION INCLUDING THE SAME

(71) Applicant: LG CHEM, LTD., Seoul (KR)

(72) Inventors: Min Cheol Ju, Daejeon (KR); Min Seung Shin, Daejeon (KR); Sung Won Hong, Daejeon (KR); In Soo Kim, Daejeon (KR); Hyung Sub Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 308 days.

(21) Appl. No.: 16/979,841

(22) PCT Filed: Dec. 4, 2019

(86) PCT No.: PCT/KR2019/017037
§ 371 (c)(1),
(2) Date: Sep. 10, 2020

(87) PCT Pub. No.: WO2020/122499
PCT Pub. Date: Jun. 18, 2020

(65) Prior Publication Data
US 2021/0054124 A1    Feb. 25, 2021

(30) Foreign Application Priority Data

Dec. 10, 2018  (KR) .................. 10-2018-0158019

(51) Int. Cl.
| | |
|---|---|
| *C08F 212/10* | (2006.01) |
| *C08F 2/18* | (2006.01) |
| *C08L 25/12* | (2006.01) |
| *C08L 55/02* | (2006.01) |

(52) U.S. Cl.
CPC .............. *C08F 212/10* (2013.01); *C08F 2/18* (2013.01); *C08L 25/12* (2013.01); *C08L 55/02* (2013.01); *C08L 2207/53* (2013.01)

(58) Field of Classification Search
CPC ........ C08F 212/10; C08F 220/44; C08F 2/18; C08F 257/02; C08F 212/08; C08L 25/12; C08L 55/02
See application file for complete search history.

(56) References Cited

U.S. PATENT DOCUMENTS

| | | |
|---|---|---|
| 3,855,354 A | 12/1974 | Takizawa et al. |
| 3,922,255 A | 11/1975 | Koestler et al. |
| 4,182,820 A | 1/1980 | Curfman et al. |
| 5,464,915 A | 11/1995 | Ballova et al. |
| 6,177,525 B1 | 1/2001 | McKee et al. |
| 2001/0009928 A1 | 7/2001 | Podszun et al. |

FOREIGN PATENT DOCUMENTS

| | | |
|---|---|---|
| CN | 1172130 A | 2/1998 |
| JP | 2002-338608 A | 11/2002 |
| KR | 10-0134640 B1 | 4/1998 |
| KR | 10-0193022 B1 | 6/1999 |
| KR | 10-2001-0012124 A | 2/2001 |
| KR | 10-2002-0048583 A | 6/2002 |
| KR | 20020048583 A * | 6/2002 |
| KR | 10-0382390 B1 | 7/2003 |
| KR | 10-2007-0030489 A | 3/2007 |
| KR | 10-2017-0076272 A | 7/2017 |
| KR | 20170076272 A * | 7/2017 |

OTHER PUBLICATIONS

Extended European Search Report for EP19894797.0 dated May 25, 2021.

\* cited by examiner

*Primary Examiner* — Mark S Kaucher

(57) ABSTRACT

The present invention relates to a method for preparing a thermoplastic copolymer using monomer droplets, a thermoplastic copolymer prepared therefrom and a thermoplastic resin composition including the same. In the preparation method, monomer droplets including an aromatic vinyl-based monomer are injected after reaching a polymerization conversion ratio of 10% to participate in the reaction after initiating polymerization, and a thermoplastic copolymer having an increased average particle diameter may be prepared in high yield.

11 Claims, No Drawings

METHOD FOR PREPARING THERMOPLASTIC COPOLYMER, THERMOPLASTIC COPOLYMER PREPARED THEREFROM, AND THERMOPLASTIC RESIN COMPOSITION INCLUDING THE SAME

CROSS-REFERENCE TO RELATED APPLICATIONS

The present application is a National Phase of International Application No. PCT/KR2019/017037, filed on Dec. 4, 2019, which claims the benefit of priority based on Korean Patent Application No. 10-2018-0158019, filed on Dec. 10, 2018, the entire contents of which are incorporated herein by reference.

TECHNICAL FIELD

The present invention relates to a method for preparing a thermoplastic copolymer using monomer droplets, a thermoplastic copolymer prepared therefrom, and a thermoplastic resin composition including the same.

BACKGROUND ART

Generally, styrene-based copolymers have excellent moldability, stiffness and electrical properties and are widely used in various industrial fields including OA products such as computers, printers and photocopiers, home appliances such as televisions and audio systems, electrical and electronic components, automobile parts, miscellaneous goods, etc.

Such styrene-based copolymers are prepared by emulsion polymerization, suspension polymerization or bulk polymerization.

By the preparation method through the emulsion polymerization, the size of the particles thus prepared is smaller when compared with that prepared by other polymerization methods, and thus, the surface area capable of participating in polymerization may be widely distributed, the temperature control of a reaction system may be easy, the polymerization may be carried out in a rapid time period, and stable polymerization may be achieved. However, due to the remains of an unreacted monomer, a polymerization additive, etc., the coloration problems and discoloration problems of a copolymer may arise, and there are problems of degrading production efficiency and treatment of equipment and waste water, because a solidification process is carried out after finishing the polymerization reaction to prepare a slurry, and post-treatment processes of washing, dehydrating and drying the slurry are required.

On the contrary, by the preparation methods through the suspension polymerization and bulk polymerization, a significantly small amount of an additive is required, and post-treatment processes are simple, and the coloration problems of a final product is rarely generated. However, by the bulk polymerization, the productivity may be excellent when compared with other polymerization methods, but there are limitations in applying in the production of various kinds in a small quantity.

Meanwhile, by the suspension polymerization, the amount used of an additive is small, post-treatment processes are relatively simple, and this method may be easily applied to the production of various kinds in a small quantity.

The suspension polymerization is generally carried out by injecting water, a dispersant, a monomer, a polymerization initiator, etc. in batch in a reactor under stirring, and polymerizing. If a monomer partially dissolved in water is used, the ratio of an initially injected monomer and the ratio of a monomer participating in initial polymerization may become different. For example, if the suspension polymerization is performed using an aromatic vinyl-based monomer and a vinylcyan-based monomer, the vinylcyan-based monomer may be partially dissolved in water, and accordingly, the ratio of the vinylcyan-based monomer participating in initial polymerization may be changed from the injection ratio of the vinylcyan-based monomer, and as a result, only the vinylcyan-based monomer may be continuously bonded to the terminal of a polymer chain and a polymer with an unhomogeneous composition may be prepared, and defects of degrading physical properties and increasing yellow index may arise.

In order to complement the weaknesses of the suspension polymerization, a method of partitively injecting a portion of a monomer to a polymer has been suggested, but due to the increase of the generation of minute particles, there are problems of decreasing yield.

Accordingly, the development of a method for preparing a copolymer through suspension polymerization, by which the improvement of yellow index and yield may be achieved simultaneously, is required.

DISCLOSURE OF THE INVENTION

Technical Problem

The present invention has an object in providing a method for preparing a thermoplastic copolymer, by which the generation of minute particles is reduced, and the yield is increased.

In addition, another object of the present invention is to provide a thermoplastic copolymer prepared by the above-described preparation method and having an increased average particle diameter when compared with common suspension polymerization.

Also, another object of the present invention is to provide a thermoplastic resin composition including the thermoplastic copolymer.

Technical Solution

To solve the above-described tasks, there is provided in the present invention a method for preparing a thermoplastic copolymer including polymerizing a first aromatic vinyl-based monomer and a vinylcyan-based monomer in the presence of a polymerization initiator, wherein monomer droplets prepared by mixing a polymerization solvent, a dispersant and a second aromatic vinyl-based monomer are injected after a polymerization conversion ratio reaches 10% during polymerizing.

In another aspect, there is provided in the present invention a thermoplastic copolymer having an average particle diameter of 400 µm to 600 µm and being a suspension polymer of an aromatic vinyl-based monomer and a vinylcyan-based monomer.

Also, there is provided in the present invention a thermoplastic resin composition including the thermoplastic copolymer and an acrylonitrile-butadiene-styrene-based copolymer.

Advantageous Effects

By the preparation method according to the present invention, monomer droplets including an aromatic vinyl-based monomer are injected during polymerizing, specifically, after initiating polymerization and after a polymerization conversion ratio reaches 10% to participate in the reaction, and ratio imbalance between monomers in a polymer system may be reduced, the generation of minute particles may be reduced, yield decrease due to the minute particles may be restrained, and a thermoplastic copolymer may be prepared in high yield.

In addition, the thermoplastic copolymer according to the present invention is prepared by the preparation method according to the present invention, by which monomer droplets are injected during performing polymerization, and a significantly increased average particle diameter may be obtained when compared with a copolymer prepared by common suspension polymerization.

Also, the thermoplastic resin composition including the thermoplastic copolymer according to the present invention has a similar average particle diameter as that of an acrylonitrile-butadiene-styrene-based copolymer included in a resin composition which is injected to the resin composition together with the thermoplastic copolymer, and roll mixing milling may become excellent and thus, the properties of yellow index may become excellent.

BEST MODE FOR CARRYING OUT THE INVENTION

Hereinafter, the present invention will be described in more detail to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The terms and a measurement method used in the present invention may be defined as follows, unless otherwise separately defined.

Terms

The term "composition" used in the present invention includes a mixture of materials including a corresponding composition as well as a reaction product formed from the materials of the corresponding composition and the decomposition product of the corresponding composition.

The term "derived unit" used in the present invention may mean a structure derived from a certain material or the material itself.

The terms "first aromatic vinyl-based monomer" and "second aromatic vinyl-based monomer" used in the present invention represent the same aromatic vinyl-based monomer, and "the first" and "the second" may be expressions for dividing timing or shape of participation in polymerization reaction.

The term "aromatic vinyl-based monomer" used in the present invention may be one or more selected from the group consisting of styrene, α-methylstyrene, α-ethylstyrene, p-methylstyrene, o-methylstyrene, o-t-butylstyrene, bromostyrene, chlorostyrene, trichlorostyrene and the derivatives thereof, particularly, styrene.

The term "vinylcyan-based monomer" used in the present invention may be one or more selected from the group consisting of acrylonitrile, methacrylonitrile, ethacrylonitrile and the derivatives thereof, particularly, acrylonitrile.

The term "conjugated diene-based monomer" used in the present invention may be one or more selected from the group consisting of 1,3-butadiene, 2,3-dimethyl-1,3-butadiene, 2-ethyl-1,3-butadiene, 1,3-pentadiene and isoprene, particularly, 1,3-butadiene.

The term "derivative" used in the present invention may represent a compound having a structure obtained by substituting one or more hydrogen atoms composing an original compound are substituted with halogen groups, alkyl groups or hydroxyl groups.

The term "monomer droplet" used in the present invention represents a material with a micelle structure including monomer particles therein, for example, a material including monomer particles in a micelle which is formed by a dispersant.

The term "minute particle" used in the present invention may represent a particle having a particle diameter of 61 μm or less, which is a by-product derived from a monomer not forming a copolymer.

[Measurement Method]

In the present invention, the "average particle diameter" is obtained by passing each copolymer through standard sieves of 2000 μm, 1400 μm, 850 μm, 425 μm, 150 μm 106 μm and 75 μm one by one, obtaining a weight percent by measuring the weight of the copolymer passed through each sieve, and calculating the average value thereof.

In the present invention, the "polymer conversion ratio" represents the degree of forming a polymer by polymerizing monomers, and may be calculated by partially collecting a polymer in a reactor during polymerization and by the following Mathematical Formula 1:

Polymerization conversion ratio (%)=[(total amount of monomers injected−total amount of unreacted monomers)/total amount of monomers injected]×100        [Mathematical Formula 1]

The present invention provides a method for preparing a thermoplastic copolymer with a small amount of minute particles generated in high yield.

The preparation method according to an embodiment of the present invention is characterized in including polymerizing a first aromatic vinyl-based monomer and a vinylcyan-based monomer in the presence of a polymerization initiator, and injecting monomer droplets prepared by mixing a polymerization solvent, a dispersant and a second aromatic vinyl-based monomer after a polymerization conversion ratio reaches 10% during the polymerization.

The copolymer of an aromatic vinyl-based monomer and a vinylcyan-based monomer is generally prepared by a preparation method through emulsion polymerization, bulk polymerization or suspension polymerization, and among them, the suspension polymerization has merits in that the amount used of an additive is small, post-treatment processes are relatively simple, and the production of various products in small quantity is advantageous. However, the suspension polymerization is batch type polymerization, and the reactant including monomers used for polymerization is injected in batch to a reactor prior to the initiation of polymerization, and in this case, a slightly water-soluble vinylcyan-based monomer dissolves, and the aromatic vinyl-based monomer and only a portion of the vinylcyan-based monomer participate in polymerization reaction at an initial stage of the polymerization. In process of time of the polymerization, only the vinylcyan-based monomer remains and continue polymerization reaction, and only the derivative units of the vinylcyan-based monomer are continuously bonded at a terminal part to prepare a copolymer having an unhomogeneous configuration, thereby generating defects concerning color such as the increase of yellow index. Accordingly, after initiating polymerization, a method of controlling ratio imbalance between monomers in a polymer during polymerization as described above by injecting partial monomers partitively during polymerization, but a portion of the monomer injected partitively reacts with a polymerization initiator which has been injected at the initiation of polymerization prior to forming a copolymer to form minute particles, and rather, the generation of minute particles is increased, the control of ratio imbalance between monomers in a polymer system becomes insignificant, and yield is decreased.

However, in the preparation method according to an embodiment of the present invention, monomer droplets are injected to a polymer system during performing suspension polymerization after initiating polymerization and at a point where a polymerization conversion ratio is 10% or more, to participate the monomer droplets in polymerization, and the reaction between a polymer initiator and the monomer in the monomer droplet may be restrained, and the control of ratio imbalance between monomers in a polymer system may become smooth while suppressing the generation of minute particles. Accordingly, a thermoplastic copolymer resolving color defects such as yellow index may be prepared in high yield.

Hereinafter, the preparation method according to an embodiment of the present invention will be explained in more particular.

The preparation method is a method for preparing a copolymer of an aromatic vinyl-based monomer and a vinylcyan-based monomer, and may be performed by polymerizing a first aromatic vinyl-based monomer and a vinylcyan-based monomer in the presence of a polymerization initiator, wherein monomer droplets are injected after a polymerization conversion ratio of 10%. Here, the polymerization may be suspension polymerization.

Particularly, the polymerization may be initiated by injecting a polymerization initiator, a first aromatic vinyl-based monomer and a vinylcyan-based monomer to a polymerization reactor, and monomer droplets may be injected and participate in polymerization reaction at a point where a polymerization conversion ratio reaches 10% or more after initiating polymerization.

The polymerization initiator is used for easily initiating polymerization and is not specifically limited as long as no adverse effects are induced and may be, for example, one or more selected from the group consisting of 2,5-dimethyl-2,5-di(t-butylperoxy)hexane, di(t-butylperoxy-isopropyl)benzene, t-butyl cumyl peroxide, di-(t-amyl)-peroxide, dicumyl peroxide, butyl 4,4-di(t-butylperoxy)valerate, t-butylperoxybenzoate, 2,2-di(t-butylperoxy)butane, t-amyl peroxybenzoate, t-butylperoxy-acetate, t-butylperoxy-(2-ethylhexyl)carbonate, t-butylperoxy isopropyl carbonate, t-butyl peroxy-3,5,5-trimethyl-hexanoate, 1,1-di(t-butylperoxy)cyclohexane, t-amyl peroxyacetate, t-amylperoxy-(2-ethylhexyl)carbonate, 1,1-di(t-butylperoxy)-3,5,5-trimethylcyclohexane, 1,1-di(t-amylperoxy)cyclohexane, t-butyl-monoperoxy-maleate, 1,1'-azodi(hexahydrobenzonitrile) and 1,1'-azobis(cyclohexane-1-cyclonitrile), and particularly, may be one or more selected from the group consisting of dicumyl peroxide, 1,1-di(t-butylperoxy)cyclohexane and 1,1'-azobis(cyclohexane carbonitrile).

In addition, the polymerization initiator may be used in 0.001 parts by weight to 0.5 parts by weight, particularly, 0.003 parts by weight to 0.45 parts by weight, or 0.06 parts by weight to 0.25 parts by weight based on 100 parts by weight of the total amount of the monomers used for polymerization, i.e., the aromatic vinyl-based monomer and the vinylcyan-based monomer. If used within the amount range, polymerization reaction may be more easily performed, and a polymerization conversion ratio may be even further increased.

The monomer droplets are prepared by mixing a water-soluble solvent, a dispersant and the second aromatic vinyl-based monomer, may have an average particle diameter of 50 μm to 300 μm, and may include the second aromatic vinyl-based monomer in 5 wt % to 70 wt %, particularly, 10 wt % to 50 wt %.

In addition, the monomer droplet may include the dispersant in 0.5 to 2.0 parts by weight based on 100 parts by weight of the second aromatic vinyl-based monomer, and in this case, the reaction of the polymerization initiator and the second aromatic vinyl-based monomer after injecting the monomer droplet may be easily suppressed, the generation amount of minute particles may be effectively decreased, and ratio imbalance between monomers in a polymer system may be effectively improved.

The dispersant is not specifically limited as long as no adverse influence upon polymerization arises, and may be, for example, one or more selected from the group consisting of water-soluble polyvinyl alcohol, partially saponified polyvinyl alcohol, polyacrylic acid, a copolymer of vinyl acetate and anhydrous maleic acid, hydroxypropyl methylcellulose, gelatin, calcium phosphate, tripotassium phosphate, hydroxyapatite, sorbitan monolaurate, sorbitan trioleate, polyoxyethylene, sodium lauryl sulfate, sodium dodecylbenzenesulfonate, and sodium dioctylsulfosuccinate, particularly, tripotassium phosphate.

In addition, the water-soluble solvent may be water, and in this case, water may be ion exchange water or deionized water.

Meanwhile, the monomer droplet may be injected in an amount such that the weight ratio of the first aromatic vinyl-based monomer and the second aromatic vinyl-based monomer becomes from 80:20 to 50:50. In this case, the ratio imbalance between monomers in a polymer system may be effectively suppressed, and the ratio between monomers in a polymer system may be maintained in balance from the initiation of polymerization to the termination of polymerization. Accordingly, a copolymer having a uniform configuration may be formed, and problems concerning color such as the yellow index of the copolymer thus prepared may be solved.

In addition, the monomer droplet may be injected after initiating polymerization and during performing polymerization, and the injection may be batch type injection, partitive injection, or continuous injection, but may be continuous injection considering the effective suppression of the ratio imbalance between monomers in a polymer system.

In addition, in the preparation method according to an embodiment of the present invention, the monomer droplet may be injected at a point where a polymerization conversion ratio is 10% or more, particularly, from 10% to 60%, and in this case, the ratio of monomers participating polymerization reaction in a polymer system may be maintained in balance during whole polymerization reaction.

Even more particularly, the monomer droplet may be continuously injected, and according to the continuous injection, injection may be initiated at a point where the polymerization conversion ratio is 10% or more and may be terminated at a point where the polymerization conversion ratio is within 60%. The total amount of the monomer droplet may be injected in a constant rate from the initiation of the injection to the termination of the injection.

Meanwhile, in the preparation method, the aromatic vinyl-based monomer and the vinylcyan-based monomer may be used in a weight ratio of 60:40 to 80:20, and here, the aromatic vinyl-based monomer may include the first aromatic vinyl-based monomer and the second aromatic vinyl-based monomer which is included in the monomer droplet, that is, may mean the total amount of the first aromatic vinyl-based monomer and the second aromatic vinyl-based monomer. If the aromatic vinyl-based monomer and the vinylcyan-based monomer are used in the above-described range, a copolymer having even better heat resistance, chemical resistance, mechanical properties and processability may be prepared.

In addition, the polymerization may be performed in any conditions which may achieve polymerization reaction easily without specific limitation, for example, in a temperature range of 80° C. to 150° C., and in this case, a polymerization conversion ratio may be increased even more.

In addition, the polymerization may be performed by additionally injecting one or more kinds of additives selected from the group consisting of a polymerization solvent, a dispersant, a molecular weight regulator and a dispersion promoter.

The polymerization solvent may be water, and in this case, the water may be ion exchange water or deionized water.

The dispersant may be the same as explained above, and may be the same as or different from the dispersant used for preparing the monomer droplet. The dispersant may be used in 0.5 parts by weight to 2.0 parts by weight, or 1.0 part by weight to 1.5 parts by weight based on 100 parts by weight of the total amount of monomers used for polymerization, and if used in the above-described range, the dispersion stability of monomers in a polymer system may be improved, and a copolymer having more uniform particles may be prepared.

In addition, the molecular weight regulator is not specifically limited as long as it does not adversely influence polymerization reaction, and may be, for example, one or more selected from the group consisting of an α-methylstyrene dimer, t-dodecyl mercaptan, n-dodecyl mercaptan, octyl mercaptan, carbon tetrachloride, methylene chloride, methylene bromide, tetraethyl thiuram disulfide, dipentamethylene thiuram difulfide and diisopropyl xantogen disulfide, particularly, t-dodecyl mercaptan. In addition, the molecular weight regulator may be used in 0.01 to 0.15 parts by weight, or 0.05 to 0.1 parts by weight based on 100 parts by weight of the total amount of monomers used for polymerization, and if used in the above-described range, a copolymer having an appropriate weight average molecular weight may be prepared.

Here, the total amount of the monomers represents the total amount of the first aromatic vinyl-based monomer, the second aromatic vinyl-based monomer and the vinylcyan-based monomer.

In addition, the present invention provides a thermoplastic copolymer prepared by the preparation method.

The thermoplastic copolymer according to an embodiment of the present invention may have an average particle diameter of 400 μm to 600 μm, and is characterized in a suspension polymer of an aromatic vinyl-based monomer and a vinylcyan-based monomer, and thus, the thermoplastic copolymer may include a derived unit from the aromatic vinyl-based monomer and a derived unit from the vinylcyan-based monomer.

Particularly, since the thermoplastic copolymer according to an embodiment of the present invention is prepared by the above-described preparation method, markedly increased average particle diameter may be achieved when compared with a copolymer prepared by common suspension polymerization.

The thermoplastic copolymer is generally applied to industries after compounding together with a rubbery polymer such as an acrylonitrile-butadiene-styrene-based copolymer. In case where materials to be compounded have similar particle diameters, roll mixing milling may be excellent, and a product having excellent physical properties may be obtained. The thermoplastic copolymer according to the present invention has an increased average particle diameter when compared with the conventional thermoplastic copolymer, and may have a similar particle diameter as that of the rubbery polymer. Accordingly, the thermoplastic copolymer may be compounded with the rubbery polymer, show high roll mixing milling, and have excellent industrial applicability.

In addition, the thermoplastic copolymer in a copolymer chain composed by combining the derived unit of an aromatic vinyl-based monomer and the derived unit of a vinylcyan-based monomer, may have a structure in which each derived unit is uniformly bonded, and the yellow index may be low and color properties may be excellent.

Meanwhile, the "yellow index" in the present invention may be obtained by manufacturing a specimen with a thickness of 3 mm for measuring physical properties, and measuring using a Color meter (Color-eye 7000A, Gretamacbeth Co.) by an ASTM E313 method. In this case, the specimen for measuring physical properties is manufactured by mixing the thermoplastic copolymer of the present invention, a graft copolymer of acrylonitrile (AN)-butadiene (BD)-styrene (SM) with a core-shell structure (AN:BD:SM=13:60:27), and a bulk copolymer of styrene-acrylonitrile (containing 30 wt % of acrylonitrile) in a weight ratio of 10:30:60, pelletizing using an extruder and then, passing through an injector. From the results measured under the same conditions except for using a different thermoplastic copolymer for manufacturing the specimen, the specimen manufactured using the thermoplastic copolymer of the present invention showed better yellow index when compared with other specimens. Accordingly, it could be found that the thermoplastic copolymer of the present invention has improved yellow index.

Also, the present invention provides a thermoplastic resin composition including the thermoplastic copolymer.

The thermoplastic resin composition according to an embodiment of the present invention is characterized in including the thermoplastic copolymer and an acrylonitrile-butadiene-styrene-based copolymer.

In addition, the thermoplastic resin composition includes the two copolymers having equivalent degrees of particle diameters as described above, and may have excellent roll mixing milling, and thus, a molded article having excellent physical properties may be manufactured.

Meanwhile, the acrylonitrile-butadiene-styrene-based copolymer plays the role of providing the thermoplastic resin composition with excellent moldability and impact resistance, and may be a graft copolymer having a core-shell structure, including a core including a derived unit of a conjugated diene-based monomer; and a shell wrapping the core and including a derived unit of an aromatic vinyl-based monomer and a derived unit of a vinylcyan-based monomer.

In addition, the acrylonitrile-butadiene-styrene-based copolymer may be prepared through emulsion polymerization and emulsion graft polymerization, for example, may be prepared by preparing a core (or seed) which is a rubbery polymer by the emulsion polymerization of a conjugated diene-based monomer, adding a vinylcyan-based monomer and an aromatic vinyl-based monomer to the core, and performing emulsion graft polymerization.

Here, the core may have an average particle diameter of 0.1 µm to 0.6 µm, particularly, 0.2 µm to 0.5 µm, or 0.2 µm to 0.4 µm, and in this case, the copolymer including the same may have even better impact resistance and mechanical properties, and a molded article manufactured from a resin composition including the same may have excellent impact resistance and glossiness.

In addition, the acrylonitrile-butadiene-styrene-based copolymer may include from 30 wt % to 70 wt % of the core including the derived unit of the conjugated diene-based monomer; and from 30 wt % to 70 wt % of the shell wrapping the core and including the derived unit of the aromatic vinyl-based monomer and the derived unit of the vinylcyan-based monomer. In this case, the shell may include the derived unit of the aromatic vinyl-based monomer and the derived unit of the vinylcyan-based monomer in a weight ratio of 7:3 to 8:2, and in this case, the impact resistance, mechanical properties and moldability of the copolymer may be even more excellent.

Meanwhile, in an embodiment of the present invention, the resin composition may further include one or more kinds of additives selected from the group consisting of an impact reinforcing agent, a lubricant, a thermal stabilizer, an anti-dripping agent, an antioxidant, a light stabilizer, a ultraviolet blocking agent, a pigment and an inorganic filler, and in this case, the additive may be used in 5 parts by weight or less, or from 0.1 parts by weight to 1.0 part by weight based on 100 parts by weight of the copolymer.

In addition, particular materials of the additive are not specifically limited as long as they are used in a thermoplastic resin composition, and for example, the anti-dripping agent may be one or more selected from the group consisting of Teflon, polyamide, polysilicone, polytetrafluoroethylene (PTFE) and a tetrafluoroethylene-hexafluoropropylene (TFE-HFP) copolymer considering the improvement of flame retardancy, and the inorganic filler may use one or more selected from the group consisting of barium sulfate, a barium glass filler and barium oxide.

Hereinafter, embodiments of the present invention will be explained in detail so that a person skilled in the art may perform easily. However, the present invention may be embodied in various different types and is not limited to the embodiments explained herein.

Preparation Example 120 parts by weight of ion exchange water, 100 parts by weight of styrene, 1.3 parts by weight of tricalcium phosphate and 0.005 parts by weight of polyoxyethylene alkyl ether phosphate were mixed to prepare monomer droplets. In this case, the monomer droplets had an average particle diameter of 200 µm and included 45 wt % of styrene.

Example 1

To a reactor, 120 parts by weight of ion exchange water, 57 parts by weight of styrene, 43 parts by weight of acrylonitrile, 0.186 parts by weight of 1,1'-azobis(cyclohexane-1-carbonitrile), 0.005 parts by weight of polyoxyethylene alkyl ether phosphate, 1.3 parts by weight of tricalcium phosphate and 0.08 parts by weight of t-dodecyl mercaptan were injected, and polymerization was initiated at 90° C. After initiating polymerization, at a point where a polymerization conversion ratio reached 10%, the monomer droplets prepared in the Preparation Example was started to injection and continuously injected in a constant rate until the polymerization conversion ratio reached 40%. In this case, the monomer droplets were injected in an amount such that the styrene and the styrene included in the monomer droplets satisfied a weight ratio of 57:43, and the amounts of the materials used for the polymerization except for the monomer droplets were based on 100 parts by weight of the total amount of the styrene and acrylonitrile used for polymerization. After finishing the injection of the monomer droplets, polymerization was performed for 4 hours further, and formic acid was injected to control the pH of a polymerization slurry to 2.5. Then, washing, dehydration and drying were carried out to prepare a copolymer of a powder.

Example 2

A copolymer of a powder was prepared by performing the same method as in Example 1 except for initiating the polymerization by injecting 65 parts by weight of styrene and parts by weight of acrylonitrile to the reactor, and injecting the monomer droplets in an amount such that the styrene used before initiating the polymerization and the styrene included in the monomer droplets satisfied 80:20.

Example 3

A copolymer of a powder was prepared by performing the same method as in Example 1 except for initiating the polymerization by injecting 54 parts by weight of styrene and 46 parts by weight of acrylonitrile to the reactor, and injecting the monomer droplets in an amount such that the styrene used before initiating the polymerization and the styrene included in the monomer droplet satisfied 50:50.

Example 4

A copolymer of a powder was prepared by performing the same method as in Example 1 except for using 0.035 parts by weight of 1,1-di(t-butylperoxy)cyclohexane and 0.025 parts by weight of dicumyl peroxide instead of 0.186 parts by weight of 1,1'-azobis(cyclohexane-1-carbonitrile).

Comparative Example 1

To a reactor, 120 parts by weight of ion exchange water, 70 parts by weight of styrene, 30 parts by weight of acrylonitrile, 0.186 parts by weight of 1,1'-azobis(cyclohexane-1-carbonitrile), 0.005 parts by weight of polyoxyethylene alkyl ether phosphate, 1.3 parts by weight of tricalcium phosphate and 0.08 parts by weight of t-dodecyl mercaptan were injected, and polymerization was performed for 6 hours at 90° C. In this case, the amounts of the materials used for the polymerization were based on 100 parts by weight of the total amount of the styrene and acrylonitrile. After finishing the polymerization, formic acid was injected to control the pH of a polymerization slurry to 2.5. Then, washing, dehydration and drying were carried out to prepare a copolymer of a powder.

Comparative Example 2

A copolymer of a powder was prepared by performing the same method as in Comparative Example 1 except for using 0.035 parts by weight of 1,1-di(t-butylperoxy)cyclohexane and 0.025 parts by weight of dicumyl peroxide instead of 0.186 parts by weight of 1,1'-azobis(cyclohexane-1-carbonitrile).

Comparative Example 3

A copolymer of a powder was prepared by performing the same method as in Example 1 except for continuously injecting styrene instead of the monomer droplets in Example 1. In this case, styrene injected before initiating polymerization and styrene continuously injected were used in a weight ratio of 57:43.

Comparative Example 4

A copolymer of a powder was prepared by performing the same method as in Example 4 except for continuously injecting styrene instead of the monomer droplets in Example 4. In this case, styrene injected before initiating polymerization and styrene continuously injected were used in a weight ratio of 57:43.

Comparative Example 5

A copolymer of a powder was prepared by performing the same method as in Example 1 except for continuously injecting the monomer droplets in a constant rate after initiating polymerization and from a point where a polymerization conversion ratio was 5% to a point where a polymerization conversion ratio reached 20%.

Experimental Example 1

The amounts of minute particles produced during preparing the copolymers of the Examples and the Comparative Examples were compared. The results are shown in Table 1.

In the Examples and Comparative Examples, after finishing the polymerization and during dehydration, the weight of particles passing through 250 mesh (61 μm) was measured and represented by parts by weight based on 100 parts by weight of the total weight of the copolymer. Particularly, the polymer slurry was dehydrated using a centrifugal dehydrator with the inner voids of the dehydrator of 250 mesh, and in this case, a mother liquor (A) came out from the voids was dried, the weight thereof (B) was measured, and the amount of minute particles (wt %) was calculated through Mathematical Formula 2 below. Here, the polymer slurry included a copolymer which is an effective material and the mother liquor, and by the dehydration, the copolymer and the mother liquor were separated and recovered.

Amount of minute particles (wt %)={dried weight (B)/mother liquor (A)}×100    [Mathematical Formula 2]

TABLE 1

| Division | Example | | | | Comparative Example | | | | |
|---|---|---|---|---|---|---|---|---|---|
| | 1 | 2 | 3 | 4 | 1 | 2 | 3 | 4 | 5 |
| Minute particles (wt %) | 0.60 | 0.70 | 0.57 | 0.62 | 0.56 | 0.60 | 0.90 | 1.40 | 0.72 |

As shown in Table 1, in Examples 1 to 4 of the present disclosure, an aromatic vinyl-based monomer was injected as a monomer droplet shape after initiating polymerization and at a point where a polymerization conversion ratio reached 10% to participate in the reaction, and minute particles were produced in a low degree which is an equivalent degree as in Comparative Example 1 and Comparative Example 2, and when compared with Comparative Examples 3 and 4 in which an aromatic vinyl-based monomer was injected in a powder shape after initiating polymerization, the amount of minute particles produced was reduced to a half or more degree. In addition, in Comparative Example 5, the preparation method was performed under the same conditions as in Example 1 except for the point of injection of the monomer droplet, but the amount of minute particles produced was markedly increased by 1.2 times in contrast to Example 1. From such results, it could be confirmed that by the preparation method according to the present invention, the ratio imbalance between monomers in a polymer system may be reduced and the amount of minute particles produced may be decreased by injecting the aromatic vinyl-based monomer in a monomer droplet shape at a point where a polymerization conversion ratio was 10% or later to participate in the reaction.

Experimental Example 2

The average particle diameter and the yellow index of the copolymers of the Examples and the Comparative Examples were compared and analyzed, and the results are shown in Table 2 below.

1) Average Particle Diameter

The average particle diameter was obtained by passing each copolymer through standard sieves of 2000 μm, 1400 μm, 850 μm, 425 μm, 150 μm 106 μm and 75 μm one by one, obtaining a weight percent by measuring the weight of a copolymer passed through each sieve, and calculating an average value thereof.

2) Yellow Index

The yellow index was obtained by manufacturing a specimen with a thickness of 3 mm for measuring physical properties using each of the copolymers, and measuring using a Color meter (Color-eye 7000A, Gretamacbeth Co.) by an ASTM E313 method. In this case, the smaller value represents smaller change of color to yellow.

Meanwhile, the specimen for measuring physical properties was manufactured by mixing each of the thermoplastic copolymers of the Examples and Comparative Examples, a graft copolymer of acrylonitrile (AN)-butadiene (BD)-styrene (SM) with a core-shell structure (weight ratio of AN:BD:SM=13:60:27/average particle diameter of 480 μm), and a bulk copolymer of styrene-acrylonitrile (containing 30 wt % of acrylonitrile) in a weight ratio of 10:30:60, pelletizing using an extruder and then, passing through an injector.

TABLE 2

| Division | Example | | | | Comparative Example | | | | |
|---|---|---|---|---|---|---|---|---|---|
| | 1 | 2 | 3 | 4 | 1 | 2 | 3 | 4 | 5 |
| Average particle diameter (μm) | 495 | 435 | 499 | 410 | 384 | 259 | 238 | 141 | 306 |
| Yellow index (b) | 5.2 | 5.7 | 5.9 | 5.6 | 6.9 | 7.4 | 6.1 | 6.7 | 6.1 |

As shown in Table 2 above, Examples 1 to 4 of the present disclosure showed similar degree of average particle diameter as that of the graft copolymer of acrylonitrile (AN)-butadiene (BD)-styrene (SM) and showed better yellow index when compared with the Comparative Examples.

Meanwhile, in Comparative Example 3 and Comparative Example 4, in which the monomer droplets suggested in the present invention were not injected but styrene was injected in a powder shape during polymerization, the average particle diameter was rather decreased than the copolymers of Comparative Examples 1 and 2, obtained through common suspension polymerization without injecting styrene during polymerization, a half degree of average particle diameter of the graft copolymer of acrylonitrile (AN)-butadiene (BD)-styrene (SM) was shown, and yellow index was markedly decreased when compared with the Examples.

In addition, in Comparative Example 5 in which the monomer droplets were used but injected at a point different from the injection point suggested by the present invention, the average particle diameter was not increased, and the yellow index properties were decreased when compared with the Examples.

Through this, by injecting the monomer droplets including an aromatic vinyl-based monomer during polymerization, particularly, after initiating polymerization and after a point where a polymerization conversion ratio reaches 10% to participate in the reaction according to the present invention, markedly increased average particle diameter may be obtained when compared with a copolymer prepared by common suspension polymerization, and a similar average particle diameter as the acrylonitrile-butadiene-styrene-based copolymer may be obtained to achieve excellent roll mixing milling. As a result, it could be found that the yellow index properties may be excellent.

The invention claimed is:

1. A method for preparing a thermoplastic copolymer comprising polymerizing a first aromatic vinyl-based monomer and a vinylcyan-based monomer in the presence of a polymerization initiator, wherein
    monomer droplets prepared by mixing water or a water-soluble solvent, a dispersant and a second aromatic vinyl-based monomer are injected after reaching a polymerization conversion ratio of 10% during polymerizing.

2. The method for preparing a thermoplastic copolymer of claim 1, wherein the monomer droplet comprises from 5 wt % to 70 wt % of the second aromatic vinyl-based monomer.

3. The method for preparing a thermoplastic copolymer of claim 1, wherein the monomer droplet comprises from 0.5 parts by weight to 2.0 parts by weight of the dispersant in based on 100 parts by weight of the second aromatic vinyl-based monomer.

4. The method for preparing a thermoplastic copolymer of claim 1, wherein the monomer droplet has an average particle diameter of 50 μm to 300 μm.

5. The method for preparing a thermoplastic copolymer of claim 1, wherein the monomer droplet is injected in an amount such that a weight ratio of the first aromatic vinyl-based monomer and the second aromatic vinyl-based monomer becomes 80:20 to 50:50.

6. The method for preparing a thermoplastic copolymer of claim 1, wherein the monomer droplets are continuously injected,
    the continuous injection is initiated at a point where the polymerization conversion ratio is 10% or more and terminated at a point where the polymerization conversion ratio is within 60%, and a total amount of the monomer droplets is injected in a constant rate from the initiation of injection to the termination of injection.

7. The method for preparing a thermoplastic copolymer of claim 1, wherein the preparation method uses a total amount of the first aromatic vinyl-based monomer and the second aromatic vinyl-based monomer, and the vinylcyan-based monomer in a weight ratio of 60:40 to 80:20.

8. The method for preparing a thermoplastic copolymer of claim 1, wherein the polymerization is suspension polymerization.

9. The method for preparing a thermoplastic copolymer of claim 1, wherein the polymerization is performed by additionally injecting one or more kinds of additives selected from the group consisting of a polymerization solvent, a dispersant, a molecular weight regulator and a dispersion promoter.

10. The method for preparing a thermoplastic copolymer of claim 1, wherein the polymerization is performed in a temperature range of 80° C. to 150° C.

11. The method for preparing a thermoplastic copolymer of claim 1, wherein a generation amount of particles having a diameter of 61 μm or less in the preparation method is from 0.5 wt % to 0.7 wt %.

* * * * *